United States Patent [19]

Chervenak et al.

[11] 4,128,109

[45] Dec. 5, 1978

[54] PRESSURE LET-DOWN VALVE ASSEMBLY FOR HANDLING ABRASIVE LIQUIDS

[75] Inventors: Michael C. Chervenak, Pennington, N.J.; Ronald H. Wolk, San Jose, Calif.

[73] Assignee: Hydrocarbon Research, Inc., Lawrenceville, N.J.

[21] Appl. No.: 645,408

[22] Filed: Dec. 30, 1975

[51] Int. Cl.[2] .......... F16K 47/00

[52] U.S. Cl. .......... 137/375; 251/118

[58] Field of Search .......... 137/375, 268; 351/118

[56] References Cited

U.S. PATENT DOCUMENTS

| | | | |
|---|---|---|---|
| 243,731 | 7/1881 | Schrumpf | 137/247.13 |
| 1,350,175 | 8/1920 | O'Connor | 137/268 |
| 2,454,160 | 11/1948 | Greene | 137/375 |
| 2,469,109 | 5/1949 | Goecke | 137/375 |
| 2,787,438 | 4/1957 | Bauer | 137/375 X |
| 2,792,845 | 5/1957 | Atherton et al. | 137/375 |
| 3,490,736 | 1/1970 | Snyder | 137/375 X |
| 3,704,856 | 12/1972 | Swiecicki | 251/118 |

*Primary Examiner*—Martin P. Schwadron
*Assistant Examiner*—Gerald A. Michalsky
*Attorney, Agent, or Firm*—Michael A. Jacobs

[57] ABSTRACT

A pressure let-down valve assembly for handling pressurized liquids which contain abrasive solids including a valve adapted for handling such liquids and a flow reversal means for changing the direction of the flowing liquid. The flow reversal means contains a chamber having an outlet located at a point which permits a sufficient amount of liquid to accumulate therein to absorb at least a portion of the energy of the flowing solids in the liquid.

11 Claims, 2 Drawing Figures

PRESSURE LET-DOWN VALVE ASSEMBLY FOR HANDLING ABRASIVE LIQUIDS

BACKGROUND OF THE INVENTION

1. Field of Invention

This invention relates to a device for reducing the erosion caused at point in process equipment where the pressure of a flowing liquid containing abrasive solids is reduced. More particularly, the invention relates to a pressure let-down assembly useful in the handling of liquefied coal.

2. Description of the Prior Art

Processing equipment used for the handling of high pressure liquids containing abrasive solids, such as liquids containing ash particles produced from the liquefication of coal, is subjected to severe erosion. As a result, frequent shutdowns are required to replace eroded parts. This erosion problem is particularly acute in pressure let-down valves since these valves reduce fluid pressures from about 1,000 to 3,000 psi to pressures close to atmospheric. This rapid pressure reduction results in fluid velocities ranging from near sonic to supersonic. Because of these high fluid flow rates, erosion of the process equipment is so rapid that replacement of valves and other associated parts may be required within a few hours or days. The erosion of the valve body can at least be partially eliminated by coating the valve with hard abrasive resistant materials, such as tungsten carbide. However, this solution is not totally satisfactory because of the uneven erosion rates in the valve. Moreover, merely coating the valve does not reduce erosion in the pipes which are downstream from the valve and which are also subjected to high fluid velocities. This erosion can be eliminated by providing an impingement plug, coated with a hard abrasion-resistant material such as tungsten carbide, in flow alignment with the fluids exiting from the valve. This plug absorbs much of the energy of the fluids and changes its flow direction.

SUMMARY OF THE INVENTION

The present invention provides an improved valve assembly for reducing erosion in the pressure let-down valve and in the pipes immediately downstream of said valve. This reduction in erosion is obtained by providing a valve adapted for handling pressurized liquids containing particulate abrasive solids with a flow reversal means for receiving liquids from the valve and changing the direction of flow of that liquid. The flow reversal means includes a chamber for receiving the liquid from the valve, a conduit connecting the outlet of the valve with the chamber and an outlet located at a point in the chamber which permits a sufficient amount of liquid to accumulate in the chamber to absorb the momentum of the solids contained in the liquid. The conduit introduces the liquid into the chamber in substantially the same direction as the liquid leaves the valve and the chamber outlet channels the fluid in a different direction. Preferably, the surface of the chamber in flow alignment with the conduit and the conduit itself are coated with hard abrasion-resistant materials such as tungsten carbide.

This let-down valve assembly is particularly useful for handling high pressure flashing liquids such as derived from coal and which contain up to about 30% solids by weight in the form of fine abrasive ash particles. It is also useful for handling flashing liquid mixtures derived from bitumen and carrying up to about 30% abrasive particulate solids in the form of fine sand particles.

DESCRIPTION OF THE PREFERRED EMBODIMENT

Figure 1:
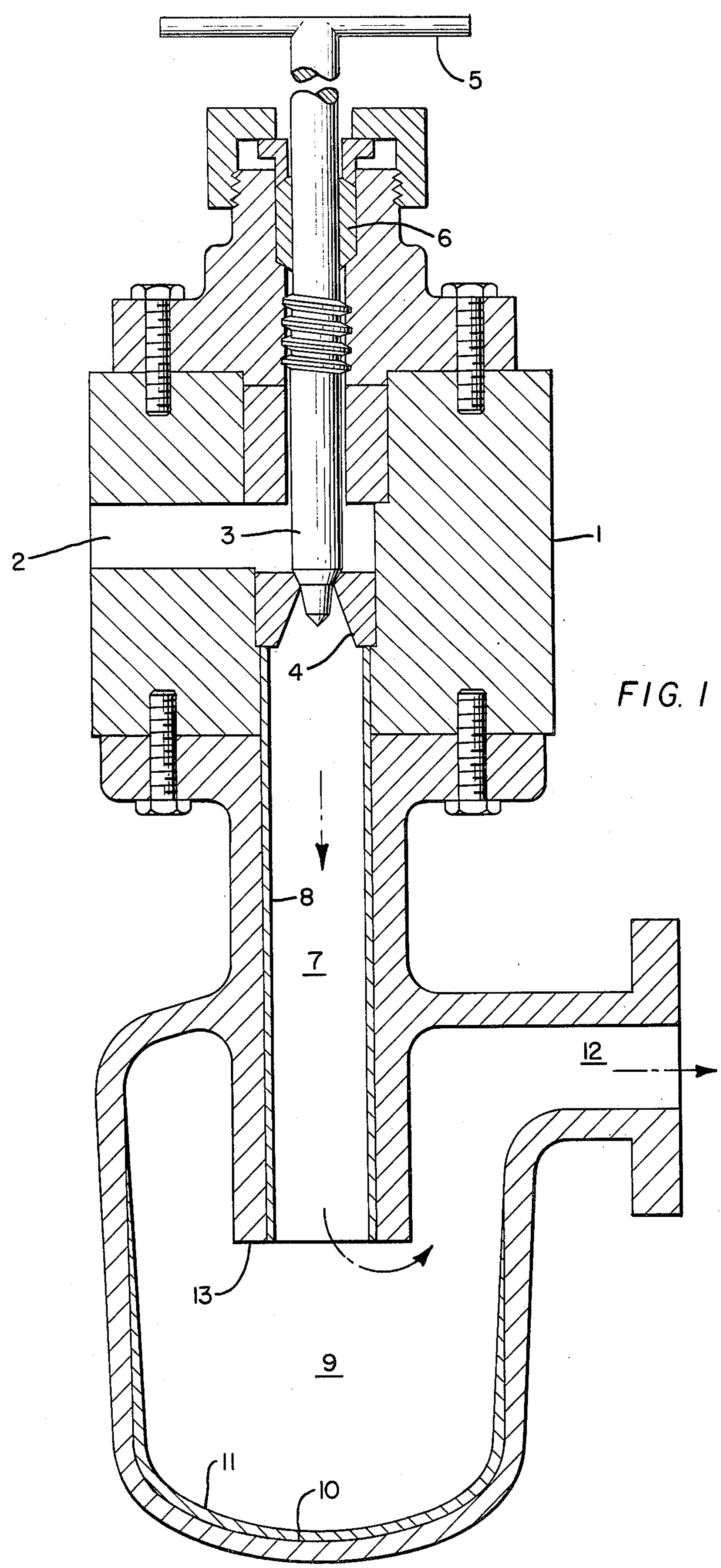
FIG. 1 illustrates the pressure let-down assembly of the invention.

As illustrated in the figure, this invention comprises a valve assembly having body 1 with inlet opening 2 and stem 3 suitable for mating with seat 4, which is preferably removable. Both the stem and the seat are preferably composed of a hard abrasion-resistant material. The stem may be actuated either manually or automatically by stem operating means 5, such as a diaphragm or pneumatic piston (not shown), and is equipped with suitable packing means 6. Located below valve seat 4 is a conduit 7 which is lined over its full length with an abrasion-resistant coating 8 which is connected to an outlet chamber 9 located below the conduit and arranged to provide for a change in the direction of flow of the fluid passing through the valve.

The outlet chamber 9 contains a surface 10 which is in flow alignment with the conduit 7 so that liquids discharging from the conduit will impact the surface and dissipate energy of the liquid. This impact surface preferably has an abrasion-resistant coating 11, such as tungsten carbide, and is concave thereby providing better absorbing characteristics. It may also be desirable to coat the protions of the chamber adjacent the impact surface with such an abrasion-resistant material. The outlet chamber has an outlet 12 through which the liquid exits. The outlet directs the fluid at an angle of at least about 60°, preferably 90°, from the direction at which it entered the chamber.

The outlet chamber is designed in a manner which permits a sufficient amount of liquid to accumulate in the chamber to absorb at least a protion of the energy of the abrasive solids entrained in the liquid. In order to achieve this result the outlet 12 should be located above the exit end 13 of the conduit 7, at a distance which is at least twice, preferably from about three to about ten times, the diameter of the conduit 8. This arrangement provides the additional advantage of achieving distinct flow reversal of the abrasive liquid before it leaves the chamber 9.

Figure 2:
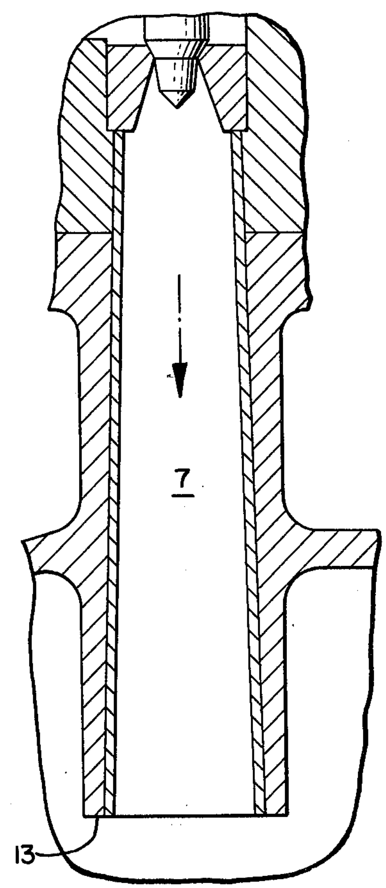
FIG. 2 illustrates a divergent conduit which can be used in the pressure let-down assembly of FIG. 1.

The outlet chamber 9 should have a cross-sectional area which is at least about five, and preferably from about 10 to about 100, times the average cross-sectional area of the conduit 7. The depth of the outlet chamber below the outlet should be at least two, and preferably from about four to about twelve, times its inside diameter. In order to provide for a greater reduction in velocity of the liquid discharging into the oulet chamber the diameter of the conduit should preferably be divergent, having its widest point at its exit end. Such an embodiment shown in FIG. 2 wherein the conduit 7 is widest at its exit end 13.

The valve body can be constructed of any material suitable for the high pressure and temperature conditions of service, such as steel, stainless steel, etc. The surface coatings used for conduit 7 and impact surface 10 should have abrasion-resistant properties equivalent to that of tungsten carbide, the preferred coating material. An example of such a material is boron carbide. Other materials are known to those skilled in the art. The coating should preferably be harder than the abrasive particles entrained in the flowing liquid. The material can be applied by a metallized flame spraying process, or by inserting a separate tight-fitting sleeve composed of the hard abrasion-resistant material. The coating should be at least 0.10 inch thick, although for best results a thickness of 0.125 to 0.250 inch is preferred.

Those skilled in the art know that the liquid should preferably enter the valve body at relatively low velocity, flow first around the stem and then pass through the seat opening. This arrangement results in having the high velocity liquid flow in the portion of the system coated with the abrasion-resistant materials and the lower flow rates around the packing and the valve seat. Thus, the valve packing and operating means are not exposed to the high velocity abrasive fluid as would occur if the flow direction was reversed.

The flow reversal chamber 9 can be either an integral part of the valve assembly or a separate component which is attached to the valve by conventional means. This latter arrangement permits replacement of the flow reversal chamber alone.

Although the valve assembly of this invention may be used for handling any abrasive fluids, it preferred usage is in handling high pressure flashing liquid streams derived from coal wherein the abrasive solids comprise particulate coal and ash produced from the hydrogenation of coal at high pressures and temperatures. In this type service, the valve inlet pressure would be of the order of 1,000–4,000 psig, and the outlet pressure would be from 25–500 psig, with the pressure ratio across the valve usually being at least 2 . Valve temperature would be about 500°–1,000° F.

We claim:

1. A let-down valve assembly comprising:

(a) a valve adapted for handling pressurized liquids containing particulate abrasive solids, and (b) flow reversal means for receiving liquid from said valve and changing the direction of flow of said liquid, said flow reversal means including (1) a chamber for receiving liquid from said valve and having a configuration which permits a sufficient amount of said liquid to accumulate in said chamber to absorb the momentum of the solids in said liquid, (2) a conduit connecting the outlet of said valve with said chamber for channeling liquid from the outlet of said valve into said chamber in substantially the same direction as the liquid leaves said valve, (3) a chamber outlet for channeling said liquid in a direction other than that in which it entered said chamber, said chamber outlet being located at a point in said chamber which permits a sufficient amount of said liquid to accumulate in said chamber to absorb the momentum of the solids in said liquid, (4) said conduit and the surface of said chamber which is in flow alignment with said conduit being coated with an abrasive resistant material.

2. The valve assembly of claim 1 wherein said chamber outlet is located above the point at which said liquid enters said chamber from said conduit.

3. The valve assembly of claim 2 wherein the cross-sectional area of said chamber is at least five times the average cross-sectional area of said conduit.

4. The let-down valve assembly of claim 3 wherein the depth of said chamber below said outlet is at least twice the inside diameter of said chamber.

5. The valve assembly of claim 4 wherein the depth of said chamber below said outlet is form about four to about 12 times the inside diameter of said chamber.

6. The valve assembly of claim 3 wherein the cross-sectional area of said chamber is from about 10 to 100 times the average cross-sectional area of said conduit.

7. The valve assembly of claim 2 wherein said chamber outlet is located above the point at which said liquid enters said chamber from said conduit a distance equal to at least twice the diameter of said conduit.

8. The valve assembly of claim 7 wherein said outlet is located above the point at which said liquid enters said chamber from said conduit about three to about 10 times the diameter of the exit of said conduit.

9. The valve assembly of claim 2 wherein said conduit is divergent, having its greatest diameter at its exit end.

10. The valve assembly of claim 2 wherein said chamber outlet channels the fluids out of said chamber at an angle of at least 60° from the direction at which the fluids entered said chamber.

11. The valve assembly of claim 10 wherein said angle is about 90°.

* * * * *